(12) United States Patent
Shin

(10) Patent No.: US 11,541,766 B2
(45) Date of Patent: Jan. 3, 2023

(54) APPARATUS FOR SENSING TEMPERATURE OF ELECTRIC VEHICLE CHARGER

(71) Applicant: JOONG ANG CONTROL CO., LTD., Cheongju-si (KR)

(72) Inventor: Hyeon Kyun Shin, Gyeonggi-do (KR)

(73) Assignee: JOONG ANG CONTROL CO., LTD., Cheongju-si (KR)

( * ) Notice: Subject to any disclaimer, the term of this patent is extended or adjusted under 35 U.S.C. 154(b) by 376 days.

(21) Appl. No.: 16/718,514

(22) Filed: Dec. 18, 2019

(65) Prior Publication Data

US 2020/0198484 A1 Jun. 25, 2020

(30) Foreign Application Priority Data

Dec. 19, 2018 (KR) .......................... 10-2018-0164747

(51) Int. Cl.
*B60L 53/16* (2019.01)
*B60L 53/60* (2019.01)
*H01R 13/713* (2006.01)

(52) U.S. Cl.
CPC .............. *B60L 53/16* (2019.02); *B60L 53/60* (2019.02); *H01R 13/7137* (2013.01)

(58) Field of Classification Search
CPC ...... B60L 53/16; B60L 53/60; H01R 13/7137
USPC ........................................................ 320/109
See application file for complete search history.

(56) References Cited

U.S. PATENT DOCUMENTS

| | | | |
|---|---|---|---|
| 2010/0198440 A1* | 8/2010 | Fujitake | B60L 53/63 701/22 |
| 2010/0214138 A1 | 8/2010 | Hollis | |
| 2011/0266868 A1* | 11/2011 | Yamamoto | B60L 58/21 307/24 |
| 2012/0206100 A1* | 8/2012 | Brown | B60L 3/0069 320/109 |
| 2014/0015494 A1* | 1/2014 | Kobayashi | H02J 7/00036 320/137 |
| 2014/0023161 A1 | 1/2014 | Navid et al. | |
| 2014/0035527 A1* | 2/2014 | Hayashigawa | B60L 3/0023 320/109 |
| 2014/0035765 A1 | 2/2014 | Bae et al. | |
| 2014/0203777 A1* | 7/2014 | Flack | B60L 3/04 320/109 |
| 2014/0217971 A1* | 8/2014 | Wu | H02J 7/0029 320/109 |

(Continued)

FOREIGN PATENT DOCUMENTS

KR 10-2017-0094869 A 8/2017

OTHER PUBLICATIONS

Office Action issued from Korean Patent Application No. 10-2018-0164747 dated Feb. 25, 2019.

*Primary Examiner* — Suresh Memula
(74) *Attorney, Agent, or Firm* — Sughrue Mion, PLLC

(57) ABSTRACT

Disclosed is an apparatus for sensing a temperature of an electric vehicle charger during charging of an electric vehicle. The apparatus is configured to sense the temperature of a charging pins using a temperature sensor provided in a charging plug, to transmit the same to the charger by serial communication using the existing signal line without adding a separate signal line, and to be supplied with power necessary for ICs and devices in the charging plug using the existing signal line during charging of the electric vehicle.

15 Claims, 5 Drawing Sheets

(56) References Cited

U.S. PATENT DOCUMENTS

| | | | | |
|---|---|---|---|---|
| 2015/0303737 | A1* | 10/2015 | Steinbuchel, IV | B60L 53/18 |
| | | | | 320/109 |
| 2016/0137079 | A1* | 5/2016 | Jefferies | B60L 53/18 |
| | | | | 320/109 |
| 2016/0339786 | A1* | 11/2016 | Dickinson | B60L 53/16 |
| 2017/0334301 | A1* | 11/2017 | Wu | B60L 53/18 |
| 2018/0229615 | A1* | 8/2018 | Shumaker | H01R 13/7137 |
| 2019/0039469 | A1* | 2/2019 | Skrbic | H02J 7/0027 |
| 2019/0296565 | A1* | 9/2019 | Connolly | H02H 5/042 |
| 2020/0156494 | A1* | 5/2020 | Niikawa | B60L 50/60 |
| 2020/0276908 | A1* | 9/2020 | Lim | H02J 7/00032 |
| 2020/0317069 | A1* | 10/2020 | Akai | H02J 7/00 |

\* cited by examiner

APPARATUS FOR SENSING TEMPERATURE OF ELECTRIC VEHICLE CHARGER

CROSS-REFERENCE TO RELATED APPLICATION

This application is based on, and claims priority from Korean Patent Application No. 10-2018-0164747 filed on Dec. 19, 2018, the disclosure of which is incorporated by reference herein in their entireties.

FIELD

The present disclosure relates to an apparatus for sensing a temperature of an electric vehicle charger during charging of an electric vehicle.

BACKGROUND

The statements in this section merely provide background information related to the present disclosure and may not constitute prior art.

In general, a charging plug is often damaged or worn during charging of an electric vehicle. Damage or wear of the charging plug may result in poor contact with pins built in a charger (charge connector). When poor contact with the pins built in the charger (charge connector) occurs, a fire may break out in the vehicle or the vehicle may explode during charging.

To prevent accidents regarding the issues described above, a temperature sensor may be installed around the charging pins built in the charger (charge connector) to reduce the charging current or cut off supplied power when the temperature exceeds a certain level.

The temperature of the charger can be sensed by installing a temperature sensor around the charging pins built in the charger (charge connector). However, the charging cable consists of four wires. Two of the four charging cables in the charger (charge connector) are used as power supply lines, and another cable is used as a ground line. Accordingly, one line can be used for signals.

In other words, the electric vehicle charging plug in the charger (charging gun) has a signal line in addition to the power supply lines, and charging is started after a signal is exchanged between the charger and the electric vehicle through the signal line. When the charger (charge connector) receives a termination signal from the electric vehicle at the end of charging, the charger terminates power supply. A general charging cable is composed of power lines, a ground line, and a signal line.

One signal line in the charger (charge connector) is already used for a charging signal sent to the electric vehicle together with the ground line. Therefore, there is no way to sense the temperature of the charger without adding a separate wire inside the charger (charge connector).

SUMMARY

It is one object of the present disclosure to provide an apparatus for sensing a temperature of an electric vehicle charger which is configured to sense the temperature of a charging pins using a temperature sensor provided in a charging plug, to transmit the same to the charger by serial communication using the existing signal line without adding a separate signal line, and to be supplied with power necessary for ICs and devices in the charging plug using the existing signal line during charging of the electric vehicle.

In accordance with one aspect of the present disclosure, provided is a charging plug including a power supply connected to a first line connecting between two control pilot (CP) terminals and a second line connecting between two protective earth (PE) terminals, the first and second lines being used for transmitting and receiving a charging signal between a charger and an electric vehicle, and configured to generate operating power based on signals input to the first line between the CP terminals; and a temperature sensor (IC2) configured to sense a temperature of a charging pin; a signal line disconnector configured to connect or disconnect the first line from one to the other of the CP terminals; and a microcomputer configured to control the signal line disconnector to disconnect the first line when the temperature of the charging pins exceeds a preset temperature threshold.

As described above, according to an embodiment, a temperature sensor is installed in the charging plug, and a circuit allowing a microcomputer to read a temperature and transmit the same to the charger by serial communication via a signal line is configured. Accordingly, power necessary for the microcomputer and the peripheral circuit may be obtained through the existing signal line.

According to an embodiment, a circuit may be configured without causing any problem in transmitting or receiving a signal required for charging of an electric vehicle, and data may be transmitted from the charger to the charger plug. Thus, a temperature threshold at which the charging operation stops may be set, and the user may be allowed to adjust the threshold according to the environment around the site.

According to an embodiment, when the temperature of the charging pins obtained using a microcomputer and a temperature sensor provided in the electric vehicle charging plug exceeds a predetermined value, charging can be stopped by cut off or short the signal line through which a charging signal is exchanged between the charger and the electric vehicle.

According to an embodiment, the operating power required for the microcomputer and the peripheral circuit provided in the electric vehicle charging plug may be obtained through a signal line without using a separate line or a 220 V power circuit.

According to an embodiment, various kinds of data related to the operation of the microcomputer may be transmitted and received to and from the charger by serial communication via the signal line. According to the embodiment, the microcomputer may be allowed to transmit and receive data by serial communication only in (−) pulses and distinguish bit data according to the magnitude of the pulse voltage, and the charging plug may be configured to obtain the operating power of the electronic circuit only in the (−) pulses of the signal power.

According to an embodiment, when the temperature of the charging pins increases, the charging plug may stop charging by shorting the signal line on the charger side and blocking the signal line on the electric vehicle side using a latching relay and a diode.

DETAILED DESCRIPTION

Hereinafter, the present disclosure will be described in detail with reference to the accompanying drawings.

In describing the present disclosure, numerical values (12 V, 6 V, 9 V, 0 V, etc.) specifically indicating a voltage applied to a circuit are merely an example of the technical idea, and those skilled in the art will appreciate that various modifications and variations can be made to the present disclosure without departing from the essential features of the present disclosure.

Figure 1:
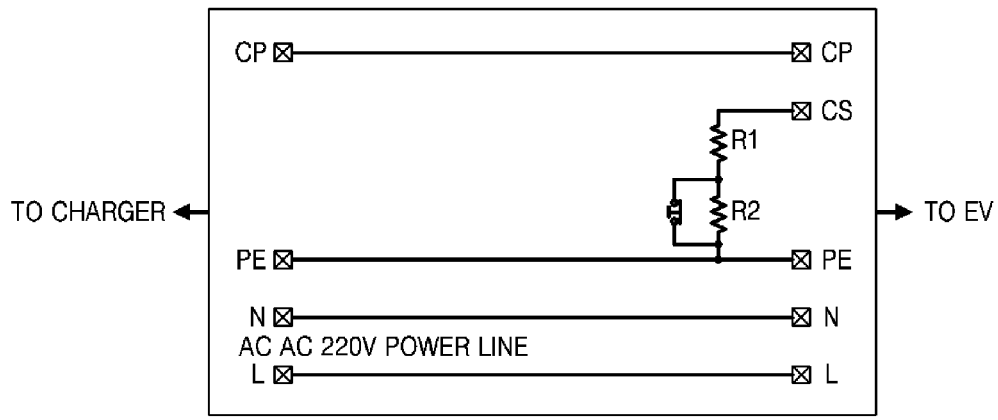
FIG. 1 is a diagram showing a general charging plug.

FIG. 1 is a diagram showing a general charging plug.

As shown in FIG. 1, a general charging plug is composed of four lines. Of the four lines in the charging plug, the four lines connected to the charger are directly connected to the electric vehicle.

Of the four lines in the charging plug, a line connecting terminals L and a line connecting terminals N are used for power supply, and a line connecting CP terminals and a line connecting PE terminals are used to transmit and receive a charging signal between the charger and the electric vehicle. A CS terminal is added, which is connected to the electric vehicle. The CS terminal is needed for the electric vehicle to check whether a charging coupler is correctly inserted into the vehicle.

Figure 2:
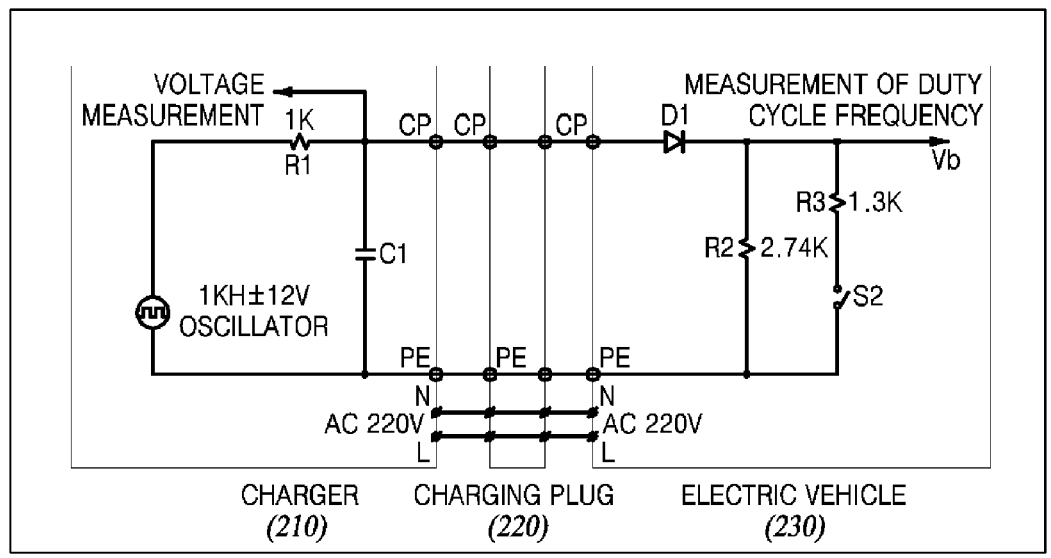
FIG. 2 is a diagram showing a basic control pilot circuit.

FIG. 2 is a diagram showing a basic control pilot circuit.

In the pilot circuit shown in FIG. 2, a charging sequence between an electric vehicle 230 and a charger 210 proceeds according to standard regulations as follows.

The charger 210 supplies a signal voltage of DC 12 V to a charging plug 220. A driver fastens the charging plug 220 to the electric vehicle 230. Once the charging plug 220 is fastened, the signal voltage drops from DC 12V to 9V by a second resistor R2 in the electric vehicle 230. When the charger 210 detects that the signal voltage drops to 9 V, it converts the signal voltage into a 1 kHz signal and supplies the converted voltage to the electric vehicle 230. When the electric vehicle 230 senses the pulse, it closes a switch S2 to connect a third resistor R3, and thus the signal voltage is adjusted to 6 V. When the charger 210 detects that the voltage drops to 6V, it closes the contactor to supply AC power. The electric vehicle 230 starts charging when the AC power is supplied. When charging is completed, the electric vehicle 230 opens the switch S2 in the electric vehicle 230 to open the third resistor R3. When the third resistor R3 in the electric vehicle 230 is opened, the signal voltage rises to 9 V. When the charger 210 detects a signal voltage of 9 V, the charger 210 opens the contactor to cut off the AC supply power. The driver removes the charging plug 220 from the electric vehicle 230. When the charging plug 220 is removed from the electric vehicle 230, the signal voltage rises to 12 V while the connection to the second resistor R2 is released. The charger 210 terminates charging upon detecting that the signal voltage rises to 12 V.

The charging procedure described above is a normal charging procedure.

According to the charging sequence, the charger 210 maintains 6 V during charging. When the signal voltage reaches 0 V or 12 V regardless of whether charging is in progress or stopped, the charger 210 stops charging and enters an initial mode.

When the charging plug 220 monitoring the temperature of the charging pins provided therein detects that the temperature of the charging pins increases, it cuts or shorts the signal line to block the charging signal from being transmitted to the electric vehicle 230. The charging plug 220 may stop charging when the signal line voltage is 0 V or 12 V.

When the temperature of the charging pins in the charging plug 220 rises and exceeds a preset temperature threshold, a relay in the charging plug 220 begins to operate to cut off the signal voltage transmitted to the electric vehicle 230. Then, the electric vehicle 230 is forced to terminate charging. At this time, the charger 210 also detects a change in the signal voltage and stops the operation of the charging mode.

After the charging pins in the charging plug 220 are checked and the cause of the temperature rise (the cause of generated heat) is eliminated, the relay will return and operate in the next charging procedure as follows.

The charger 210 transmits a pulse voltage of +6V and −12V to the electric vehicle 230 to perform normal charging. The charging plug 220 checks whether a temperature rises in any one of the charging pins provided in the charging plug 220, using the temperature sensor. When a temperature rises in any one of the charging pins provided in the charging plug 220, a microcomputer in the charging plug 220 reads the temperature. When the temperature exceeds a preset temperature threshold, the microcomputer transmits an OFF pulse to the relay to turn off the relay. When the relay contact is switched to OFF, the charging plug 220 interrupts the signal voltage supplied to the electric vehicle 230. Here, +6 V applied through the charger 210 drops to 0 V as it reaches the ground line PE via the fourth diode D4. −12 V applied through the charger 210 is maintained. The electric vehicle 230 stops charging because the signal line is open and no signal voltage is supplied. The charger 210 detects that the signal line is cut and the (+) pulse voltage drops to 0 V. Because the (−) pulse voltage is maintained as −12 V, the charger detects a temperature rise in a charging pin in the charging plug 220, and stops supply of the AC power. The charger 210 transmits reset data to the charging plug 220 to restart the charging plug 220. When the charging plug 220 receives the reset data from the charger 210 via the signal line, the microcomputer in the charging plug 220 transmits an ON pulse to the relay such that the relay is turned on. The charger 210 switches to the normal mode and waits for charging.

The voltage of 12 V generated by the charger 210 is transmitted to the CP line via the first resistor R1. The electric vehicle receives the signal voltage of 12 V through the CP terminal via the charging plug 220. The signal voltage of 12 V is applied to the PE terminal via the second resistor R2 via the first diode D1 in the electric vehicle 230 such that current flows to the charger 210.

Therefore, since the first diode D1 is present in the electric vehicle 230, only +12 V is applied to the electric vehicle 230. When DC 12 V drops to 9 V by the second resistor R2, the charger 210 detects dropping of the signal voltage and outputs a 1 kHz oscillation signal.

Figure 3:
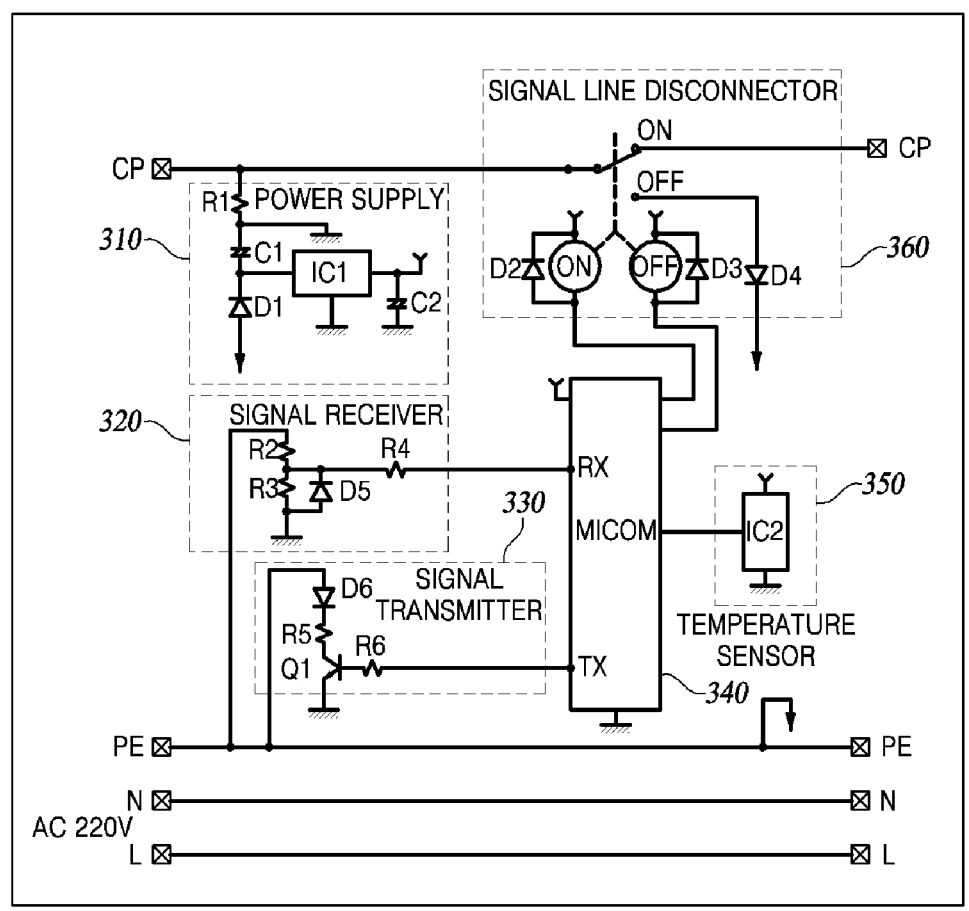
FIG. 3 is a circuit diagram of a charging plug including a temperature sensor according to an embodiment.

FIG. 3 is a circuit diagram of a charging plug including a temperature sensor according to an embodiment.

The charging plug 220 according to the embodiment may include a power supply 310, a signal receiver 320, a signal transmitter 330, a microcomputer 340, a temperature sensor 350, and a signal line disconnector 360. Components included in the charging plug 220 are not necessarily limited thereto.

Each component included in the charging plug 220 may be connected to a communication path connecting a software module or a hardware module inside the apparatus to cooperate with other components. These components communicate with each other through one or more communication buses or signal lines.

Each component of the charging plug 220 illustrated in FIG. 3 refers to a unit for processing at least one function or operation, and may be implemented by a software module, a hardware module, or a combination of software and hardware.

The power supply 310 is connected to a line (hereinafter, 'first line') connecting between the two control pilot (CP) terminals and a line (hereinafter, 'second line') connecting between the two protective earth (PE) terminals for transmission and reception of a charging signal between the charger 210 and the electric vehicle 230. The power supply 310 generates operating power based on a signal applied through the CP terminal and the PE terminal and supplies the generated power into the charging plug 220.

The power supply 310 includes a first resistor R1, a first electrolytic capacitor C1, a first diode D1, a constant voltage IC IC1, and a second electrolytic capacitor C2.

One side of the first resistor R1 is connected to the first line connecting between the CP terminals, and the other side of the first resistor R1 is connected to one side of the first electrolytic capacitor C1. The contact between the other side of the first resistor R1 and one side of the first electrolytic capacitor C1 is connected to the ground.

The one side of the first electrolytic capacitor C1 is connected to the other side of the first resistor R1, and the other side of the first electrolytic capacitor C1 is connected to the cathode of the first diode D1.

The cathode of the first diode D1 is connected to the other side of the first electrolytic capacitor C1. The anode of the first diode D1 is connected to the second line connecting between the PE terminals. One side of the constant voltage IC IC1 is connected to the contact between the first electrolytic capacitor C1 and the first diode D1, and the other side of the constant voltage IC IC1 is connected to one side of the second electrolytic capacitor C2. The one side of the second electrolytic capacitor C2 is connected to the other side of the constant voltage IC IC1, and the other side of the second electrolytic capacitor C2 is connected to the ground.

When a (+) pulse is supplied through the CP terminal, the power supply 310 prevents the current from flowing due to the first diode D1. When a (−) pulse is supplied through the CP terminal, current flows to the first resistor R1 via the first electrolytic capacitor C1 via the first diode D1, thereby charging the first electrolytic capacitor C1.

The power supply 310 converts the voltage charged in the first electrolytic capacitor C1 into a constant voltage via the constant voltage IC IC1 to charge the second electrolytic capacitor C2 such that power is applied to the microcomputer 340.

The signal receiver 320 is connected to the second line connecting between the PE terminals to receive data from the charger 210 and the electric vehicle 230. The signal receiver 320 includes a second resistor R2, a third resistor R3, a fourth resistor R4, and a fifth diode D5.

One side of the second resistor R2 is connected to the second line, and the other side of the second resistor R2 is connected to one side of the third resistor R3. The one side of the third resistor R3 is connected to the other side of the second resistor R2, and the other side of the third resistor R3 is connected to the ground.

The cathode of the fifth diode D5 is connected to the contact between the other side of the second resistor R2 and the one side of the third resistor R3, and the anode of the fifth diode D5 is connected to the other side of the third resistor R3.

One side of the fourth resistor R4 is connected to the contact between the second resistor R2 and the third resistor R3 and the cathode of the fifth diode D5. The other side of the fourth resistor R4 is connected to the RX terminal of the microcomputer 340.

The signal receiver 320 lowers the signal (charger signal) received from the PE terminal to a value that can be read by the microcomputer 340 using the second resistor R2 and the third resistor R3.

When a (+) pulse is input into the first line from CP terminal, a (−) pulse is obtained on the third resistor R3 with respect to the ground and the microcomputer 340 reads a value via the fourth resistor R4. More specifically, when a (+) pulse is received from the CP terminal, the signal receiver 320 causes −0.6 V to appear on the third resistor R3 and causes the microcomputer 340 to read 0 V via the fourth resistor R4 regardless of the magnitude of the signal voltage supplied from the charger 210 due to the fifth diode D5.

When a (−) pulse is input into the first line from the CP terminal, a voltage divided by the second resistor R2 and the third resistor R3 is obtained on the third resistor R3 and the microcomputer 340 reads a value via the fourth resistors R4. At this time, the microcomputer 340 distinguishes whether the pulse received from the charger 210 is −12 V or −9 V. When the pulse received from the charger 210 is −12 V, the microcomputer 340 reads '1'. When the pulse received from the charger 210 is −9 V, the microcomputer reads '0'.

The signal transmitter 330 is connected to the second line between the PE terminals to transmit data to the charger and the electric vehicle. The signal transmitter 330 includes a sixth diode D6, a fifth resistor R5, a first transistor Q1, and a sixth resistor R6.

The anode of the sixth diode D6 is connected to the second line, and the cathode of the sixth diode D6 is connected to one side of the fifth resistor R5. The one side of the fifth resistor R5 is connected to the cathode of the sixth diode D6, and the other side of the fifth resistor R5 is connected to the collector of the first transistor Q1.

The collector of the first transistor Q1 is connected to the other side of the fifth resistor R5, and the base of the first transistor Q1 is connected to one side of the sixth resistor R6. The emitter of the first transistor Q1 is connected to the ground. The one side of the sixth resistor R6 is connected to the base of the first transistor Q1, and the other side of the sixth resistor R6 is connected to the Tx terminal of the microcomputer 340.

In case that (−) pulse is input to the first line from the CP terminal, when the signal transmitter 330 receives a 'HIGH' signal from the Tx terminal of the microcomputer 340, the first transistor Q1 switches to ON, and thus a current flows to the first transistor Q1 via the sixth diode D6 and the fifth resistor R5. On the other hand, when the signal transmitter 330 receives a 'LOW' signal from the Tx terminal of the microcomputer 340, the first transistor Q1 switches to OFF.

The microcomputer 340 transmits data to the signal transmitter 330. The microcomputer 340 receives data from the signal receiver 320. When the temperature of a charging pin exceeds a preset temperature threshold, the microcomputer 340 controls the signal line disconnector 360 to disconnect the first line between the CP terminals.

The microcomputer 340 transmits and receives data to and from the charger 210 by serial communication through the second line connecting between the PE terminals, using the signal receiver 320 and the signal transmitter 330. The microcomputer 340 obtains the operating power and performs communication only when the (−) pulse of the input signal voltage is input to the first line connecting between the CP terminals. In addition, the microcomputer 340 distinguishes bit data according to the magnitude of the voltage of the pulse.

The temperature sensor (IC2) 350 is configured to sense the temperature of the charging pin, and is connected to the microcomputer 340 to transmit the temperature of the charging pin to the microcomputer 340.

The temperature sensor (IC2) 350 senses the temperature of the charging pin, converts the sense the temperature into an analog voltage, and outputs the voltage to the microcomputer 340. The microcomputer 340 is supplied with the analog voltage output from the temperature sensor 350, converts the supplied voltage into a digital signal using an AD converter present in the microcomputer 340, and stores the converted digital signal as a temperature value of the charging pin. The microcomputer 340 compares the temperature value of the charging pin with a preset temperature value to operate the signal line disconnector 360, or transmits temperature data according to a request received from the charger 210.

The signal line disconnector 360 is connected to the microcomputer 340 and configured to cut or short the first line connecting between the CP terminals under control of the microcomputer 340. The signal line disconnector 360 includes a latching relay, a second diode D2, a third diode D3, and a fourth diode D4.

The ON contact of the latching relay is connected to one side of the first line connecting between the CP terminals. The second diode D2 is connected to the ON coil of the latching relay, the third diode D3 is connected to the OFF coil of the latching relay, and the anode of the fourth diode D4 is connected to the OFF contact of the latching relay. The cathode of the fourth diode D4 is connected to the second line connecting between the PE terminals.

The second diode D2 and the third diode D3 of the signal line disconnector 360 prevents counter electromotive force which results from the relay coils. The signal line disconnector 360 maintains the ON state in the initial operation. When the temperature of the charging pin exceeds a preset temperature threshold, and the OFF coil of the latching relay operates under control of the microcomputer 340, the contact of the latching relay shifts to OFF, and thus the first line is disconnected between the two CP terminals and is substantially shorted to the second line via the fourth diode D4. Then, the charging signal transmitted to the electric vehicle 230 is turned off, and the pulse signal from the charger 210 is shorted through the fourth diode D4 connected to the OFF side contact of the latching relay. Then, the charger 210 detects disconnection of the first line.

The charging plug 220 should obtain operating power required for a peripheral circuit including the microcomputer 340 via the CP line (i.e., the first line). As shown in FIG. 3, the charging plug 220 has a first resistor R1 connected in series in the charger 210. According to a standard protocol, the first resistor R1 uses 1 kΩ. Thus, when a current as little as 1 mA flows, a voltage drop of 1 V occurs. An error may occur in the charger 210 or the electric vehicle 230, which operates according to a mutual sequence, due to the voltage drop. Therefore, power cannot be obtained through the CP line in a usual way.

As shown in FIG. 2, the charging signal is applied to the electric vehicle 230 via the first diode D1 in the electric vehicle 230. Accordingly, when a (−) pulse is supplied during supply of an oscillation signal (at 1 kHz), the polarity of the first diode D1 is reversed, and thus current does not flow into the electric vehicle 230. Since the electric vehicle does not perform any operation when the (−) pulse is supplied, the charging plug 220 is supplied with the operating power only when the (−) pulse is input.

When a (+) pulse is supplied into the power supply 310, no current flows due to the first diode D1 in the power supply 310, as shown in FIG. 3. When a (−) pulse is supplied, current flows to the first resistor R1 via the first electrolytic capacitor C1 through the first diode D1, and thus the first electrolytic capacitor C1 is charged.

The voltage charged in the first electrolytic capacitor C1 is converted into a constant voltage by the constant voltage IC IC1, and the second electrolytic capacitor C2 is charged with the constant voltage. The charged voltage in the second electrolytic capacitor C2 is used as the operating power for operating the microcomputer 340.

The temperature sensor IC2 converts the sensed temperature into an analog voltage and outputs the analog voltage. The microcomputer 340 is supplied with the analog voltage output from the temperature sensor 350, converts the supplied voltage into a digital signal using an AD converter present in the microcomputer 340, and stores the digital signal as a temperature value of the charging pin.

The microcomputer 340 compares the temperature value of the charging pin with a preset temperature value to operate the signal line disconnector 360, or transmits temperature data according to a request received from the charger 210.

In this embodiment, while the IC configured to output an analog voltage is exemplified as the temperature sensor 350, various sensors such as a temperature sensor configured to output a digital signal or a temperature sensor configured to indicate a temperature by a change in resistance may be applied. The microcomputer 340 may read the temperature from the temperature sensor 350 in various ways using the internal AD converter or a serial communication function.

The signal line disconnector 360 includes a relay. Various relays may be applied to the signal line disconnector 360 to stop charging by cutting off the signal voltage applied to the electric vehicle 230. However, as shown in FIG. 3, with the latching relay, power consumption may occur only in the initial operation, and may not occur during maintenance of the operation state. Thereby, power consumption can be reduced as much as possible.

While the signal line disconnector 360 is described as having a structure provided with operation coils for the ON-OFF operation as an example, a circuit for the signal line disconnector may be configured by applying various types of relays or power devices.

The second diode D2 and the third diode D3 in the signal line disconnector 360 prevent counter electromotive force which results from the relay coils during the relay operation.

The relay is programmed to maintain the ON state during the initial operation. When the temperature of the charging pin rises above the preset temperature threshold, the relay is switched to the OFF state to cut off the signal power transmitted to the electric vehicle 230.

When the signal voltage is 0 V, the electric vehicle 230 automatically stops charging. When the relay in the signal line disconnector 360 is switched to OFF, the first line is shorted to the second line via the fourth diode D4, and thus the voltage of the (+) pulse input from the CP terminal drops to 0.6 V.

The charger 210 recognizes that the signal line is disconnected on the (+) side, and thus stops supplying AC power regardless of the in-vehicle operation of the electric vehicle 230. Meanwhile, the (−) pulse input from the CP terminal maintains −12 V, and therefore the charger 210 can recognize the disconnection as a short operation caused by the temperature rise in the charging plug 220, not as a mechanical disconnection of the signal line.

The signal receiver 320 receives a signal from the charger 210 and uses the second resistor R2 and the third resistor R3 to lower the signal to a value readable by the microcomputer 340. When the (+) pulse is input from the CP terminal, −0.6 V is exhibited on the third resistor R3 by the fifth diode D5, and the microcomputer 340 reads 0 V via the fourth resistor R4.

When the (−) pulse is input from the CP terminal, a voltage divided by the second resistor R2 and the third resistor R3 is obtained on the third resistor R3 and the microcomputer 340 reads a value via the fourth resistor R4. At this time, the microcomputer 340 distinguishes whether the pulse received from the charger 210 is −12 V or −9 V. When the pulse received from the charger 210 is −12 V, the microcomputer 340 reads '1'. When the pulse received from the charger 210 is −9 V, the microcomputer reads '0'.

The signal transmitter 330 is a circuit configured to transmit temperature data about the current temperature of the temperature sensor 350 to the charger 210. During (+) period of the pulse input from the CP terminal, the signal transmitter 330 operates to have no effect on the charging pug 220, due to the sixth diode D6 in the signal transmitter 330, regardless of a control signal from the TX terminal of the microcomputer 340. On the other hand, during (−) period of the pulse, the signal transmitter 330 transmits the data by adjusting the voltage of the (−) pulse input from the CP terminal. In an embodiment, a protocol between the charger 210 and the charging plug 220 is defined as follows: −12 V is read as '1' and −9 V is read as '0'.

When the 'HIGH' signal (the VCC voltage of the microcomputer 340) is output from the TX terminal of the microcomputer 340, the first transistor Q1 provided in the signal transmitter 330 is switched to ON. During the (−) pulse period of the pulse input from the CP terminal, the current flows to the first transistor Q1 via the sixth diode D6 and the fifth resistor R5.

Therefore, when it is assumed that the (−) pulse input from the CP terminal is −12 V, the pulse is changed to −9 V. Since the receiver of the charger 210 receives −9 V the receiver reads the data as '0'.

If the 'LOW' signal (0 V) is output from the TX terminal of the microcomputer 340, the first transistor Q1 provided in the signal transmitter 330 is switched to OFF. Since no current flows to the fifth resistor R5 due to the transistor Q1 switched to OFF, the pulse of −12 V is maintained. Accordingly, the receiver of the charger 210 reads the data as '1'.

Figure 4:
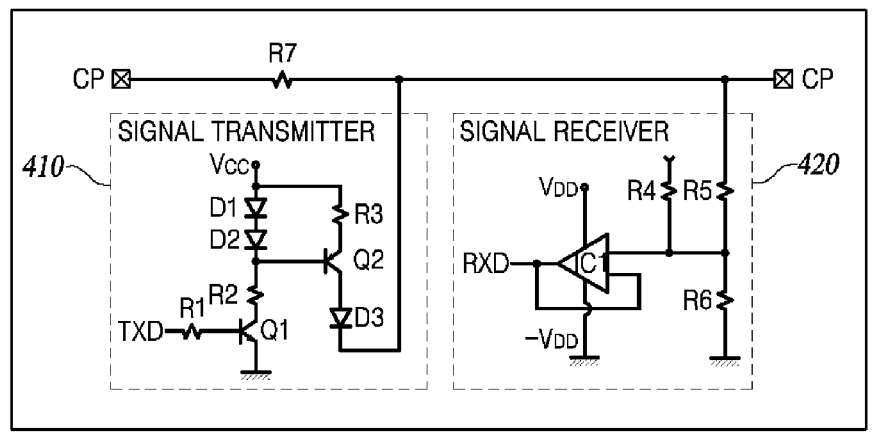
FIG. 4 is a diagram showing a charger data transceiver according to the present embodiment.

FIG. 4 is a diagram showing a charger data transceiver according to the present embodiment.

The charger 210 includes a charger signal transmitter 410 and a charger signal receiver 420, which are configured to transmit and receive data to and from the charging plug 220.

When a (+) pulse is input from the CP terminal, the charger signal transmitter 410 has no effect on the charger 210 regardless of the state of the charger TXD terminal, because the third diode D3 is provided in the charger signal transmitter 330.

When a (−) pulse is input from the CP terminal and a 'HIGH' signal (the VCC voltage of the microcomputer) is applied to the TXD terminal, the first transistor Q1 is switched to ON through the first resistor R1 of the base. Current flows from the VCC terminal to the first transistor Q1 via the first diode D1, the second diode D2, and the second resistor R2.

1.2 V obtained by a voltage drop by the first diode D1 and the second diode D2 is applied to the base terminal of the transistor Q2, and thus the transistor Q2 is switched to ON. The VCC voltage causes the current to flow to the CP terminal via the third resistor R3, the transistor Q2, and the third diode D3. When 1.2 V is applied to the base of the transistor Q2, 0.6 V is applied to the third resistor R3, which is connected to the emitter of the transistor Q2. For the data communication, change of the pulse voltage of −12 V to −9 V is needed. 3 mA flows causes a voltage drop of 3 V occurs because the resistance R7 on the first line is 1000 Ω. Therefore, in order to cause the current of 3 mA to flow at the voltage 0.6 V applied to the emitter terminal of the transistor Q2, the third resistor R3 needs to be 200Ω.

In the charger signal receiver 420, voltages of +12 V and −12 V relative to the ground cannot be read by a microcomputer. Accordingly, the charger signal receiver 420 comprises a divider circuit including the fifth resistor R5 and the resistor R6 to narrow a voltage variation range. The fourth resistor R4 is connected to the VCC terminal of the microcomputer, and has a parallel resistance of two resistors R5 and R6. When the VCC voltage of the microcomputer is 3 V and the input voltage range of the AD converter of the microcomputer needs to be 0 to 3 V, the fifth resistor R5 may be 200 kΩ, the resistor R6 may be 50 kΩ, and the fourth resistor R4 may have the parallel resistance value 40 kΩ of the resistors R5 and R6. An OP AMP 101 is used for amplification of the current of a received signal.

A procedure of transmission and reception of data is needed between the charger 210 and the charging plug 220.

The charging plug 220 detects increase in temperature of the charging pin in the charging plug 220 and stops charging by cutting off the signal line when the temperature exceeds a preset temperature threshold. Accordingly, damage to the charging pin and related accidents may be prevented. In this regard, a temperature of the charging pin at which the charging plug 220 is to cut off the signal line should be determined.

For the charging plug 220, the preset temperature threshold may be set to about 120° C. However, the temperature threshold set in the charging plug 220 may be set to a lower value in a place, such as a gas station, where explosive inflammables are handled. In summer or a local area undergoing hot weather, the temperature corresponding to the temperature threshold set in the charging plug 220 may be set to a higher value.

In case that the temperature threshold set in the charging plug 220 is changed, a temperature setter may be separately implemented in the charging plug 220 to set a temperature value to interrupt the signal voltage.

However, when a separate temperature setter is implemented inside or outside the charging plug 220, a malfunction may easily occur or an inconvenience of operation may be caused. For example, when a separate temperature setter is exposed to the outside of the charging plug 220, the temperature threshold may be changed by many unspecified operations. Disposing the temperature setter inside the charging plug 220 may cause inconvenience by, for example, requiring the charging plug to be opened every time the temperature threshold is changed. To address this issue, in the present embodiment, the charger 210 transmits the temperature threshold for disconnecting the signal line through the signal line and the charging plug 220 is configured to read the corresponding signal.

Figure 5:
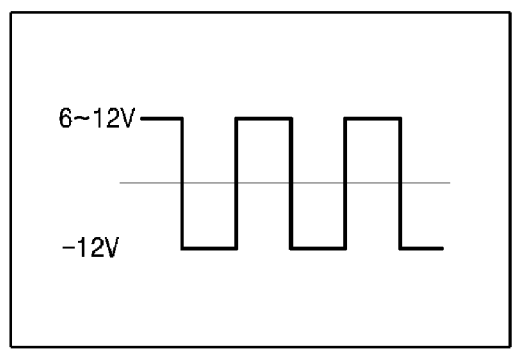
FIG. 5 is a waveform diagram of a signal voltage between a charger and an electric vehicle according to an embodiment.

FIG. 5 is a waveform diagram of a signal voltage between a charger and an electric vehicle according to an embodiment A signal voltage waveform between the charger 210 and the electric vehicle 230 is shown in FIG. 5.

The charger 210 sends 1 kHz pulses by a slow charger standard specification.

As shown in FIG. 5, the (+) pulse maintains 6 V and the (−) pulse maintains −12 V during charging. Accordingly, while the temperature setting data is not transmitted, 1 kHz pulses of +6 V and −12 V are output during charging.

Figure 6:
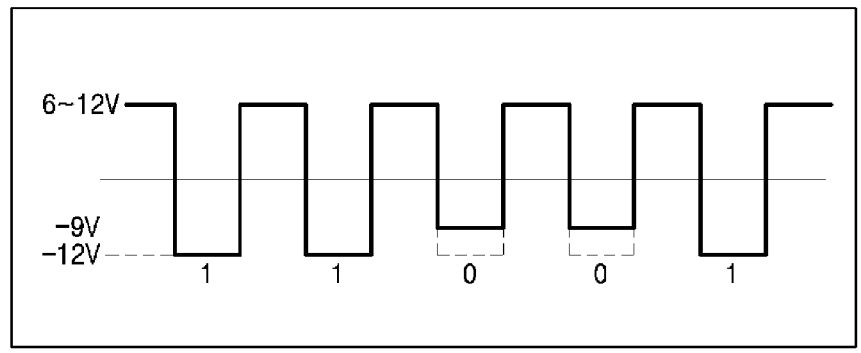
FIG. 6 is a diagram illustrating distinction of signal voltage data according to an embodiment.

FIG. 6 is a diagram illustrating distinction of signal voltage data according to an embodiment.

In the present embodiment, '1' and '0' are used as the temperature setting data. When the charger 210 transmits '1', a pulse of −12 V is output. When the charger 210 transmits '0', −9V is output.

For data bits, 8 bits are 1 byte. A total of 10 bits is set by adding a start bit and a stop bit at the start and end of the data.

In setting the temperature, 3 bytes are set to 1 packet, and thus 1 packet has 30 bits.

Among the data in 3 bytes, 1ST DATA always sends 0C9H, and 2ND DATA, which is temperature setting data, may be 0 to 0FFH, which represent temperature from 0° C. to 255° C. in decimal. 3rd DATA is used when the charger 210 receives the temperature of the charging pin in the charging plug 220. When the charging plug 220 reads and transmits the temperature, the charger 210 receives the temperature data.

For reference, a protocol for temperature setting and current temperature reception is shown in Table 1.

TABLE 1

Data Structure

| START BIT | 1 BIT | Always LOW |
| DATA BIT | 8 BITS | 0 - OFFH |
| STOP BIT | 1 BIT | Always HIGH |

1 PACKET STRUCTURE (BASED ON CHARGER)

| $1^{ST}$ DATA (Transmitted) | START DATA (Always 0C9H) |
| $2^{ND}$ DATA (Transmitted) | SET TEMPERATURE DATA (0 - OFFH) |
| $3^{RD}$ DATA (Received) | CURRENT PIN TEMPERATURE DATA (0 - OFFH) |

Figure 7:
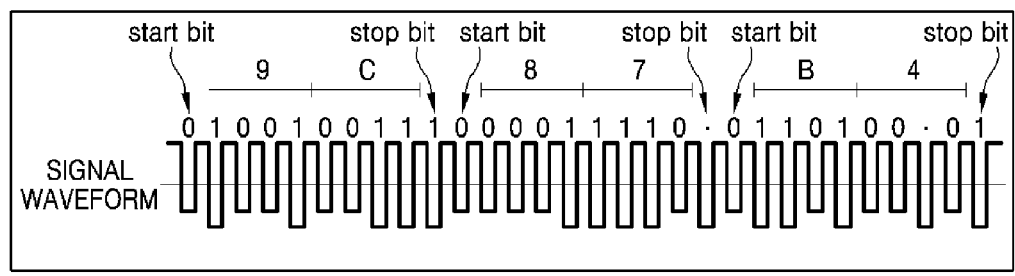
FIG. 7 is a diagram illustrating a protocol for temperature setting according to an embodiment.

FIG. 7 is a diagram illustrating a protocol for temperature setting according to an embodiment.

The data waveform obtained when the temperature threshold is set to 120° C. is shown in FIG. 7.

Since 120° C. is 078H in hexadecimal, 0C9H and 078H are transmitted as data corresponding to 120° C. The start data is transmitted in an order of START BIT, BIT0, BIT1, BIT2, . . . , BIT7, and STOP BIT, and the START DATA is always 0C9H.

Next, 078H is transmitted as the temperature setting data. Meanwhile, the charger 210 send a −12 V pulse every (−) pulse period, and receives, through the charger signal receiver 420, −12 V or −9 V adjusted according to the operation of the signal transmitter 330 of the charging plug 220. The charger 210 distinguishes a bit value of '1' or '0' according the received voltage value, and thereby reads a total of 10 bits as the current pin temperature data.

After receiving 0C9H, 078H, and 2 bytes, the charging plug 220 transmits the charging pin temperature data using the signal transmitter 330.

In the example illustrated in FIG. 7, the read charging pin temperature is 75° C., which is 04BH in hexadecimal, and is transmitted to the charger 210.

Figure 8:
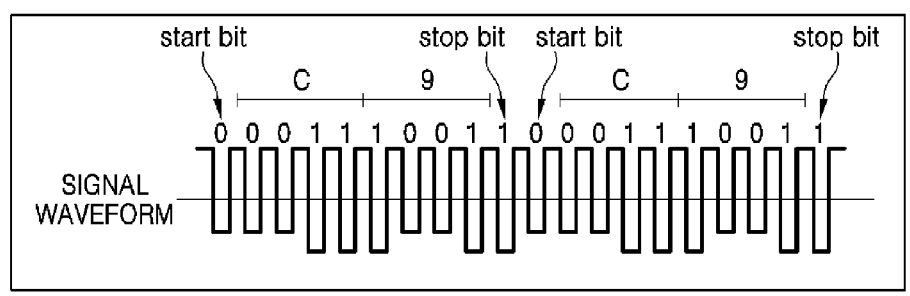
FIG. 8 is a diagram illustrating a charging plug relay reset protocol according to an embodiment.

FIG. 8 is a diagram illustrating a charging plug relay reset protocol according to an embodiment.

When the temperature of the charging pin of the charging plug 220 rises and the relay is operated to stop charging, the charger 210 detects the temperature rise and takes appropriate measures.

After recovering from an accident, the charger 210 connects the signal line by transmitting reset data to the charging plug 220. A charging plug relay reset protocol needed for this operation is shown in Table 2 below.

TABLE 2

Data Structure

| START BIT | 1 BIT | Always LOW |
| DATA BIT | 8 BITS | 0 - OFFH |
| STOP BIT | 1 BIT | Always HIGH |

1 PACKET STRUCTURE (BASED ON CHARGER)

| $1^{ST}$ DATA (Transmitted) | START DATA (Always 09CH) |
| $2^{ND}$ DATA (Transmitted) | RESET DATA (Always 09CH) |

When 09CH is received twice in succession, the charging plug 220 recognizes the signal as a relay reset signal, and resets the relay. Then, the charging plug enters the initial mode and waits.

The above description is merely illustrative of the technical idea of the present disclosure, and those skilled in the art will appreciate that various modifications and changes can be made without departing from the spirit and scope of the embodiments. Therefore, the embodiments are not intended to limit the technical idea of the present disclosure but to describe the present disclosure, and the scope of the technical idea of the present disclosure is not limited by the embodiments. Thus, the scope of protection sought by the present disclosure should be determined by the appended claims and their equivalents, and all changes coming within the meaning and equivalency range of the appended claims are intended to be embraced therein.

REFERENCE NUMERALS

210: Charger
220: Charging plug
230: Electric vehicle
310: Power supply
320: Signal receiver
330: Signal transmitter
340: Microcomputer
350: Temperature sensor
360: Signal line disconnector
410: Charger signal transmitter
420: Charger signal receiver

What is claimed is:

1. A charging plug comprising:
  a power supply connected to a first line connecting between two control pilot (CP) terminals and configured to generate operating power based on signals input to the first line between the CP terminals;

a second line connecting between two protective earth (PE) terminals, the first line and the second line being used for transmitting and receiving a charging signal between a charger and an electric vehicle; and a temperature sensor configured to sense a temperature of a charging pin;

a signal line disconnector configured to connect or disconnect the first line from one to the other of the CP terminals; and a microcomputer configured to control the signal line disconnector to disconnect the first line when the temperature of the charging pin exceeds a preset temperature threshold, wherein the signal line disconnector comprises a latching relay, a second diode, a third diode, and a fourth diode, and wherein an ON contact of the latching relay is connected to the first line, the second diode is connected to an ON coil of the latching relay, the third diode is connected to an OFF coil of the latching relay, and an anode and a cathode of the fourth diode is respectively connected to an OFF contact of the latching relay and the second line.

2. The charging plug of claim 1, wherein the power supply is configured to supply the operating power to the microcomputer when a first polarity of pulse is input to the first line, wherein the power supply does not supply the operating power to the microcomputer when a second polarity of pulse is input to the first line, the second polarity being opposite to the first polarity.

3. The charging plug of claim 1, wherein the power supply comprises a first resistor, a first electrolytic capacitor, a first diode, a constant voltage IC, and a second electrolytic capacitor, wherein one side of the first resistor is connected to the first line, an opposite side of the first resistor is connected to one side of the first electrolytic capacitor, and a contact between the opposite side of the first resistor and the one side of the first electrolytic capacitor is connected to a ground, wherein the opposite side of the first electrolytic capacitor is connected to a cathode of the first diode, an anode of the first diode is connected to the second line, and one side of the constant voltage IC is connected to a contact between the first electrolytic capacitor and the first diode, and an opposite side of the constant voltage IC is connected to one side of the second electrolytic capacitor, and an opposite side of the second electrolytic capacitor is connected to the ground.

4. The charging plug of claim 3, wherein, when a positive pulse is supplied through the first line connecting between the CP terminals, no current flows due to the first diode, wherein, when a negative pulse is supplied, a current flows to the first resistor via the first electrolytic capacitor through the first diode to charge the first electrolytic capacitor, and wherein a charged voltage in the first electrolytic capacitor is converted into a constant voltage by the constant voltage IC to charge the second electrolytic capacitor such that power is supplied to the microcomputer.

5. The charging plug of claim 1, wherein the temperature sensor senses the temperature of the charging pin, converts the temperature into an analog voltage, and outputs the analog voltage to the microcomputer, wherein the microcomputer supplied with the analog voltage output from the temperature sensor converts the analog voltage into a digital signal using an AD converter present in the microcomputer, and stores the digital signal as a temperature value of the charging pin.

6. The charging plug of claim 1, wherein the signal line disconnector is configured to connect the first line between the CP terminals in an ON state, and substantially short the first line to the second line in an OFF state.

7. The charging plug of claim 1, wherein the second diode and the third diode prevent counter electromotive force generated in the ON coil and the OFF coil of the latching relay during operation of the latching relay, wherein, when the temperature of the charging pin exceeds the preset temperature threshold while the latching relay initially maintains an ON state, the latching relay is switched to an OFF state under control of the microcomputer.

8. The charging plug of claim 1, further comprising at least one of:

a signal receiver connected to the second line between the PE terminals to receive data from the charger and the electric vehicle; and a signal transmitter connected to the second line between the PE terminals to transmit data to the charger and the electric vehicle, wherein the microcomputer transmits data to the signal transmitter, and receives data from the signal receiver.

9. The charging plug of claim 8, wherein the signal receiver is configured to:

when a first polarity of pulse is input to the first line, receive and send to the microcomputer a voltage of the first polarity of pulse, and when a second polarity of pulse is input to the first line, receive and send to the microcomputer a substantial zero value.

10. The charging plug of claim 8, wherein the signal receiver comprises a second resistor, a third resistor, a fourth resistor, and a fifth diode;

wherein one side of the second resistor is connected to the second line, an opposite side of the second resistor is connected to one side of the third resistor, and an opposite side of the third resistor is connected to a ground, wherein a cathode of the fifth diode is connected to a contact between the opposite side of the second resistor and the one side of the third resistor, and an anode of the fifth diode is connected to the opposite side of the third resistor, and wherein one side of the fourth resistor is connected to the contact between the second resistor and the third resistor and the cathode of the fifth diode, and an opposite side of the fourth resistor is connected to an RX terminal of the microcomputer.

11. The charging plug of claim 10, wherein, when a positive pulse is input into the first line, a negative pulse is obtained on the third resistor with respect to the ground of the microcomputer and 0 V is output via the fourth resistor and input to the microcomputer, and wherein, when the negative pulse is input into the first line, a voltage divided by the second resistor and the third resistor is obtained on the third resistor and is read by the microcomputer via the fourth resistor.

12. The charging plug of claim 8, wherein the signal transmitter is configured to:

when a first polarity of pulse is input to the first line, adjust a voltage of the first polarity of pulse according to a control signal from the microcomputer, and when a second polarity of pulse is input to the first line, perform on operation regardless of the control signal from the microcomputer.

13. The charging plug of claim 8, wherein the signal transmitter comprises a sixth diode, a fifth resistor, a first transistor, and a sixth resistor, wherein an anode of the sixth diode is connected to the second line connecting between the PE terminals, and a cathode of the sixth diode is connected to one side of the fifth resistor, wherein an opposite side of the fifth resistor is connected to a collector of the first transistor, a base of the first transistor is connected to one side of the sixth resistor, an emitter of the first transistor is connected to a ground, and an opposite side of the sixth resistor is connected to a Tx terminal of the microcomputer.

14. The charging plug of claim 13, wherein, when a negative pulse is input to the first line, the first transistor is switched to ON to thereby cause a current to flow to the first transistor via the sixth diode and the fifth resistor, in response to a 'HIGH' signal from the Tx terminal of the microcomputer, and the first transistor is switched to OFF in response to a 'LOW' signal from the Tx terminal of the microcomputer.

15. The charging plug of claim 8, wherein the microcomputer is configured to transmit and receive data to and from the charger by serial communication through the second line using the signal receiver and the signal transmitter, and distinguishes bit data according to a voltage magnitude of a signal voltage input from the second line.

\* \* \* \* \*